United States Patent [19]
Saito et al.

[11] Patent Number: 5,218,607
[45] Date of Patent: Jun. 8, 1993

[54] COMPUTER HAVING A RESUME FUNCTION AND OPERABLE ON AN INTERNAL POWER SOURCE

[75] Inventors: Toshimitsu Saito, Fuchu; Junko Konno, Oome, both of Japan

[73] Assignee: Kabushiki Kaisha Toshiba, Kawasaki, Japan

[21] Appl. No.: 943,982

[22] Filed: Sep. 11, 1992

Related U.S. Application Data

[63] Continuation of Ser. No. 540,643, Jun. 19, 1990, abandoned.

Foreign Application Priority Data

Jun. 23, 1989 [JP] Japan ............................... 1-162235

[51] Int. Cl.⁵ .......................................... G06F 11/00
[52] U.S. Cl. ................................... 371/66; 364/273.4; 364/DIG. 1; 364/945.3; 364/DIG. 2; 365/228; 395/575
[58] Field of Search ............ 371/66; 364/273.4, 945.3; 365/228; 395/575

[56] References Cited

U.S. PATENT DOCUMENTS

| | | | |
|---|---|---|---|
| 4,412,284 | 10/1983 | Kerforne et al. | 364/200 |
| 4,458,307 | 7/1984 | McAnlis et al. | 364/200 |
| 4,757,505 | 7/1988 | Marrington et al. | 371/66 |
| 4,763,333 | 8/1988 | Byrd | 371/66 |
| 4,782,468 | 11/1988 | Jones et al. | 365/229 |
| 4,868,832 | 9/1989 | Marrington et al. | 371/66 |
| 4,959,774 | 9/1990 | Davis | 364/200 |
| 5,008,846 | 4/1991 | Inoue | 371/66 |
| 5,021,983 | 6/1991 | Nguyen et al. | 371/66 |

*Primary Examiner*—Charles E. Atkinson
*Attorney, Agent, or Firm*—Oblon, Spivak, McClelland, Maier & Neustadt

[57] ABSTRACT

A computer having a resume function and operable on an internal battery is equipped with a circuit for checking the output voltage of the battery and a controller. When the output voltage of the internal battery becomes equal to or less than a predetermined value during data processing, a resume processing is executed for data protection irrespective of whether a resume mode is set ON or OFF, and the content of the data processing in progress is saved. When the output voltage of the internal battery is restored to a level greater than the predetermined value, data processing is resumed based on the saved content.

22 Claims, 9 Drawing Sheets

COMPUTER HAVING A RESUME FUNCTION AND OPERABLE ON AN INTERNAL POWER SOURCE

This application is a continuation of application Ser. No. 07/540,643, filed on Jun. 19, 1990, now abandoned.

BACKGROUND OF THE INVENTION

1. Field of the Invention

The present invention relates to a technique of preventing data destruction or the like due to a reduction in voltage of an internal power source (e.g., a battery) of a computer, which has a resume function and is operable on such an internal power source.

2. Description of the Related Art

Recently, so-called laptop computers have been developed which is compact, light and easily portable. To make a good use of the portability, one of the features of such laptop computers, they are generally designed to be operable on both an AC commercial power source and an internal power source (an ordinary battery or a rechargeable battery).

Some of laptop computers have a so-called resume function. The "resume function" retains, for example, the contents of data processing done immediately before the power switch of a computer is turned off, during the power-OFF period, and thus permits the data processing, execution of a program, data display, etc. from the state immediately before the power-OFF when the power switch is turned on again.

Conventional laptop computers with such a resume function have no specific association given between the voltage of the internal power source and ON/OFF of the resume function.

Even with the resume function, the conventional laptop computers are likely to have undesirable accidents due to a reduction in output voltage of the internal power source, such as data destruction and interruption or incomplete termination of execution of a program (data processing), thus wasting the processing time.

In this respect, the conventional computers operable on an internal power source and having a resume function have a low operational reliability.

SUMMARY OF THE INVENTION

Accordingly, it is a primary object of the present invention to provide a computer with a higher reliability.

It is another object of this invention to provide a computer and a data processing method, which does not lose or waste data or data processing which has been executed, even when the voltage of an internal power source becomes abnormal.

To achieve the above objects, a computer according to the present invention has data processor for processing data; and power source for supplying power to the data processor. Further the computer has detecting circuit for detecting a status of the power source means; data retaining circuit for retaining system data indicating a status of data processing having been executed by the data processor when a status of the power source becomes abnormal, in response to a detection result of the detecting means; and continuing means for permitting the data processing means having executed by the data processor when the system data has been retained, in response to the system data held by the retaining circuit when the power source returns to a normal status from the abnormal status, in response to a detection result of the detecting circuit.

A data processing method according to the present invention comprises the steps of: supplying power; executing data processing using the power; detecting a voltage of the power; interrupting the data processing when the voltage of the power is determined to be equal to or lower than a predetermined value in the detection step; and continuing the interrupted data processing from an interrupted state when the voltage of the power is determined to return to a level equal to or greater than a predetermined value in the detection step.

With the above arrangement, data processing can be resumed from where it has been interrupted when the power source returns to the normal status from the abnormal one. This feature can prevent data processing having been executed before the abnormal status of the power source occurs, from being lost or wasted, thus improving the reliability of the computer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

A computer apparatus according to a preferred embodiment of the present invention will now be described referring to the accompanying drawings.

The arrangement of a computer according to this embodiment will be described first, referring to FIGS. 1 through 3.

Figure 1:
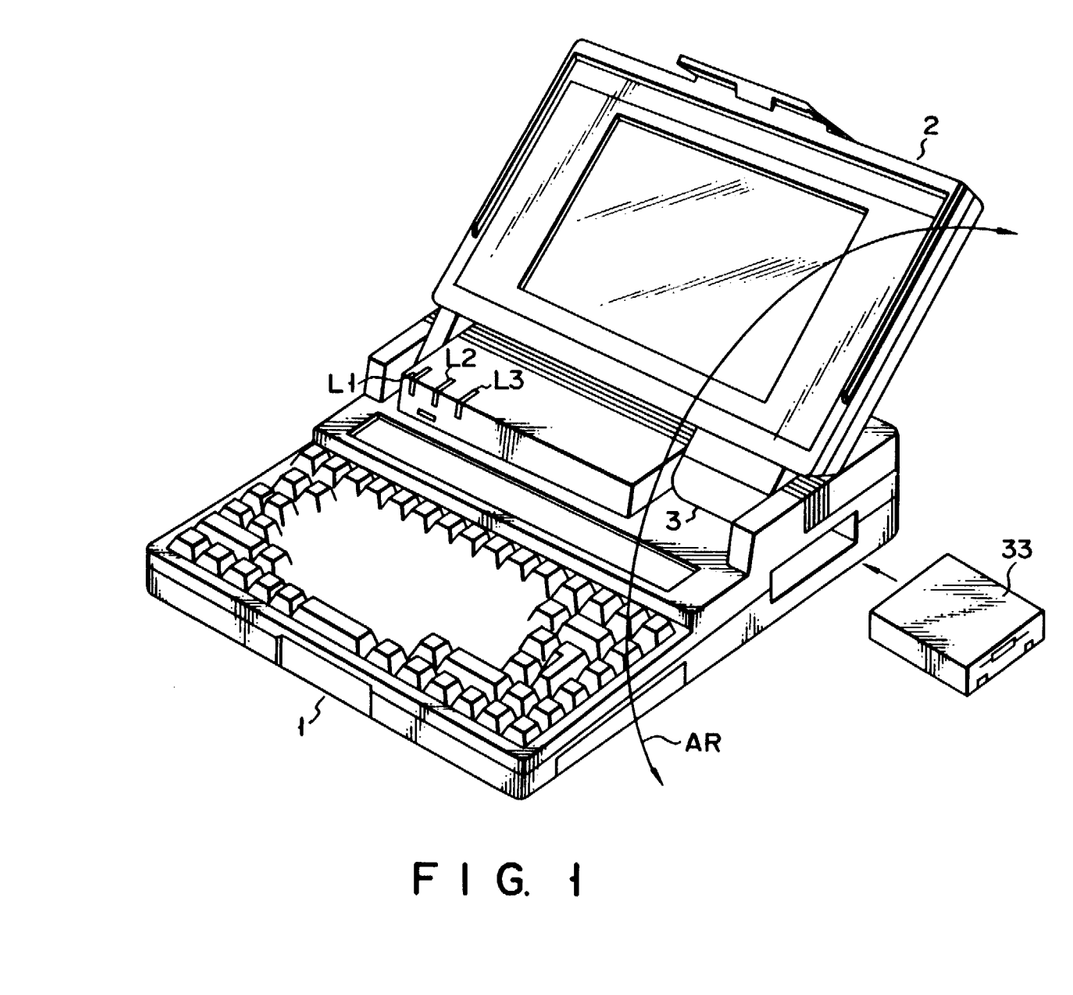
FIG. 1 is a perspective view of a computer according to one embodiment of the present invention.

As shown in FIG. 1, this computer has a body 1 and a display unit 2 connected by means of a hinge section 3. The body 1 is equipped with a keyboard 36, a slit for mounting an external floppy disk 33 and various connectors, and LEDs L1, L2 and L3.

The display unit 1 has a liquid crystal display 37, which is equipped with a light (back light) for illuminating the liquid crystal layer from the back.

The hinge section 3 permits the display unit 2 to swing in the direction of the arrowhead AR with respect to the body 1.

The circuit arrangement of the computer of this embodiment will now be described with reference to FIG. 2.

Figure 2:
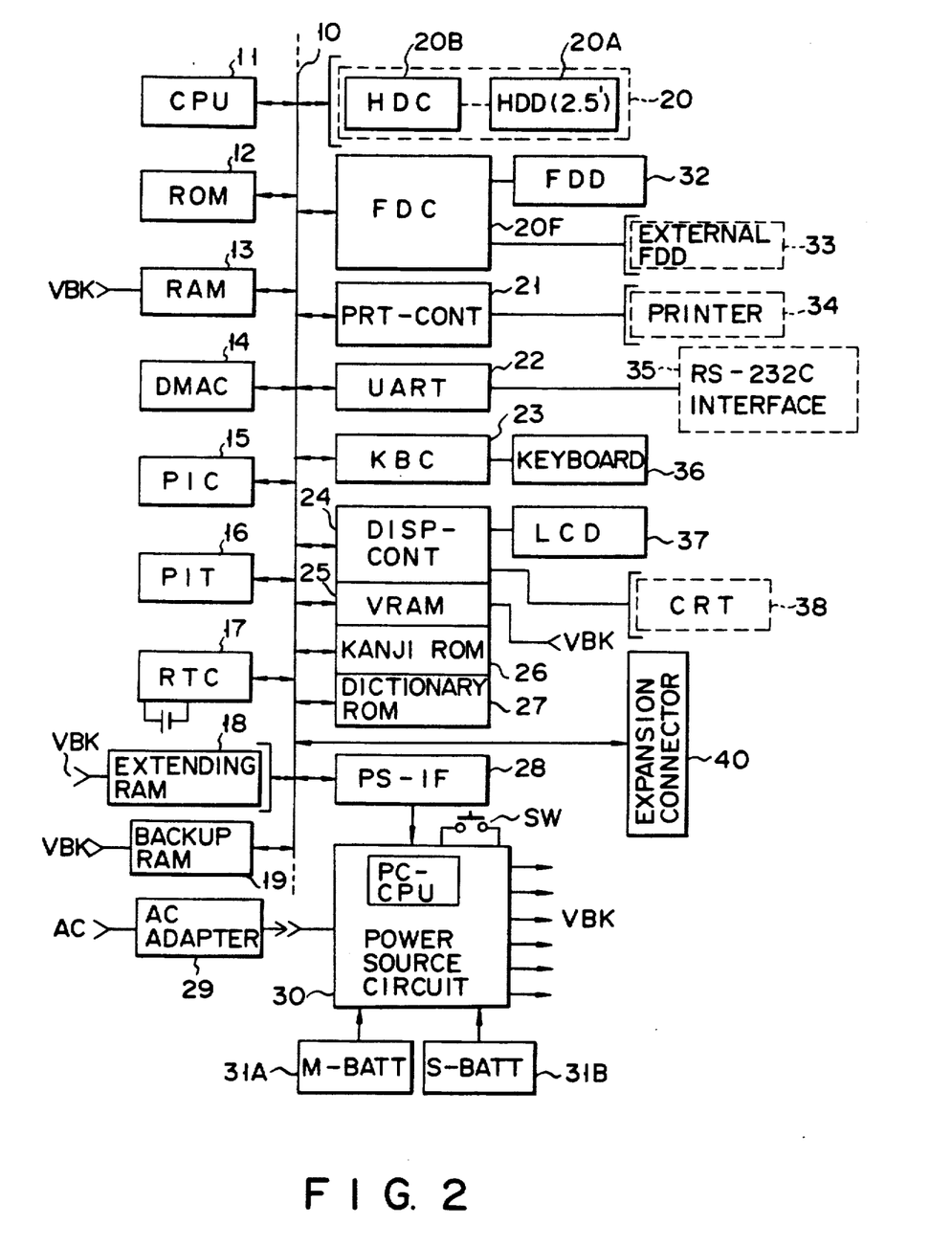
FIG. 2 is a block diagram illustrating the circuit structure of the computer.

Referring to FIG. 2, components 11 to 27 are coupled to a system bus 10. The CPU 11 in this embodiment performs the general control of the system and has the processing functions as illustrated by the flowcharts shown in FIGS. 7 through 9, which will be described later. The CPU 11 is a host (main) CPU as viewed from a power control CPU 306 of a power source circuit 30, which will be described later.

The ROM 12 stores a fixed program, fixed data and the like. The RAM 13 stores a program, data, etc. which are the target of processing. The DMA controller 14 performs a direct memory access control.

The PIC (Programmable Interrupt Controller) 15 is programmable and outputs a interrupt signal. The PIT (Programmable Interval Timer) 16 is also programmable and counts a set time.

The RTC (Real Time Clock) 17 is a clock which has its own operation battery and measures the present time.

The extending RAM 18 is detachably mounted into an exclusive card slot on the body, has a relatively large memory capacity, and is supplied with a backup voltage (VBK). The backup RAM 19 holds data for realizing a resume function and is also supplied with the backup voltage (VBK).

The hard disk pack 20 is detachably mounted in an exclusive receiving section of the body, and comprises a 2.5-inch hard disk drive (HDD) 20A and a hard disk controller (HDC) 20B for controlling the access of the drive.

The video RAM (VRAM) 25, supplied with the backup voltage (VBK), stores display image data. The kanji ROM 26 stores kanji (Chinese character) character codes and kanji character patterns and is used to acquire kanji character patterns from the kanji character codes. The dictionary ROM 27 stores pairs of kana (Japanese alphabet) and kanji and is used to convert a kana character into a corresponding kanji.

A power-source control interface 28 connects a power source circuit 30 (see FIG. 2), which will be described later, to the CPU 11 via the system bus 10.

Power information from the power control CPU 306 of the power source circuit 30 is transmitted to the the PS-IF 28 serially, and is set in a register in the PS-IF 28. The PS-IF 28 generates an NMI (Non Maskable Interrupt, such as a low-battery NMI or power-OFF NMI) according to the contents of the register and sends it to the host CPU 11.

A power source adapter (AC adapter) 29 rectifies and smoothes a commercial AC voltage to provide a DC operation voltage of a predetermined potential.

The AC adapter 29 is to be plugged in the personal computer body.

The power source circuit 30 supplies power to the individual components of the computer apparatus; its arrangement will be described later referring to FIG. 3.

A battery 31A serving as a main battery (M-BATT) is constituted by a rechargeable battery and is detachably connected to the power source circuit 30. A battery 31B serving as a sub-battery is also constituted by a rechargeable battery and is built in the body of the computer apparatus.

A floppy disk drive (FDD) 32 is connected to the floppy disk controller 20F. An external floppy disk drive 33 is connected to the floppy disk controller 20F as needed.

A printer 34 is connected to the printer controller 21 as needed. An interface unit 35 is connected to the input/output interface 22 as needed, and includes an RS-232C interface. A keyboard 36 is connected to the keyboard controller 23. An LCD display unit 37 comprises a liquid crystal display and is connected to the display controller 24. A CRT 38 is coupled to the display controller 24 as needed. An expansion connector 40 is coupled with an expansion unit when needed.

The structure of the power source circuit 30 will be described below referring to FIG. 3.

Figure 3:
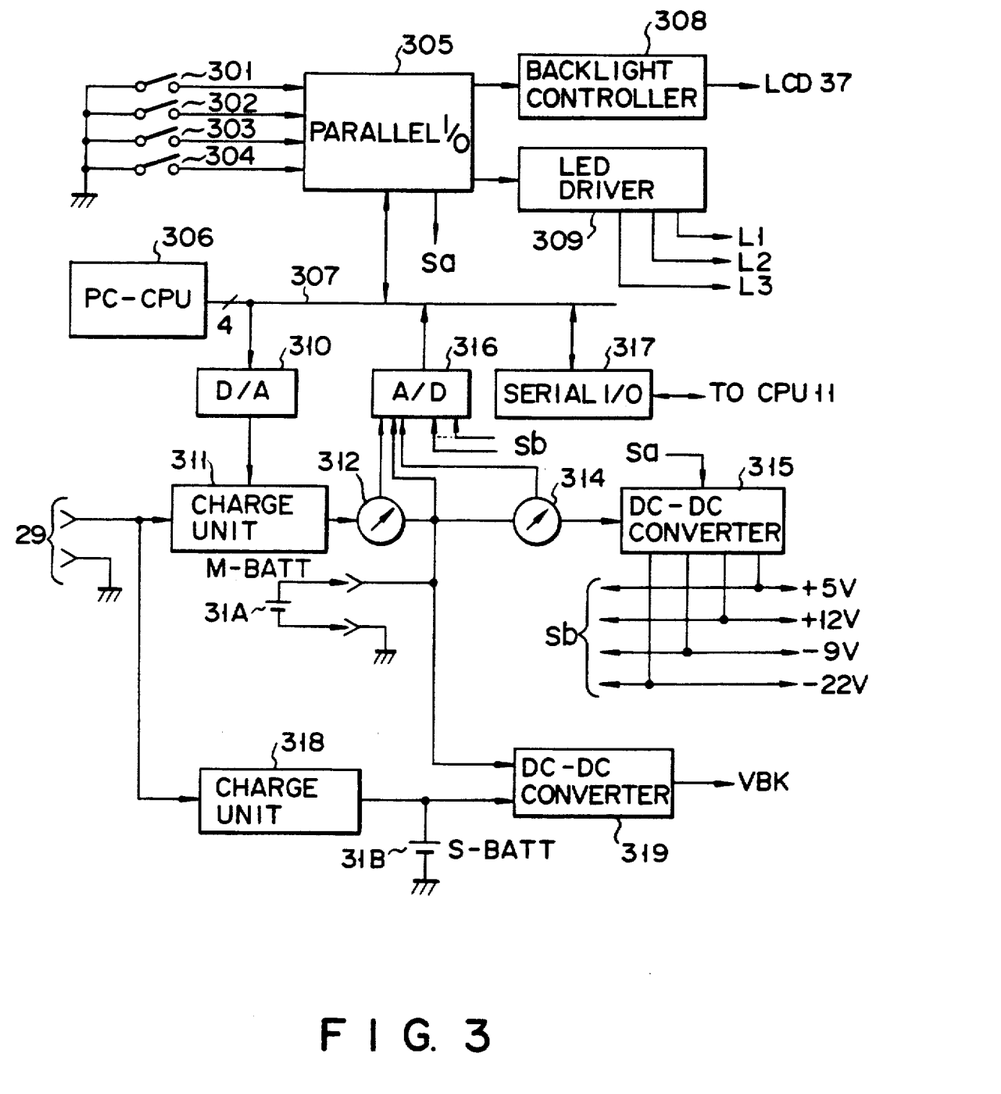
FIG. 3 is a block diagram illustrating the arrangement of a power source circuit.

In FIG. 3, reference numeral 301 denotes a power switch, 302 denotes a reset switch, 303 denotes a display switch, and 304 denotes a ready-setting switch provided on an expansion unit. A parallel I/0 305 holds the statuses of the individual switches 301 to 304 and setting information from the power control CPU 306 (to be described in detail later).

The power control CPU (PC-CPU) 306 mainly controls the supply of power to the individual components in the computer apparatus. More specifically, the power control CPU 306 receives information of the individual components of the power source circuit 30 and a command from the host CPU 11 via an internal bus 307, and controls the power supply to the individual components of the computer apparatus in accordance with the received command from the host CPU 11, the internal status of the apparatus, an externally-supplied command, etc. The operation of the PC-CPU 306 will be described later referring to FIGS. 5 and 6.

A back light controller 308 controls the amount of illumination of a back light disposed in the LCD display unit 37, and supplies power to the back light according to the set status of a variable resistor (not shown) for illumination control.

An LED driver 309 controls ON and OFF of various LEDs under the control of the power control CPU 306. These LEDs include L1 indicating a power ON/OFF status and the operational speed, L2 indicating a low-battery status and L3 indicating the connecting status of the AC adapter. In this embodiment, the LEDs can provide two-color display, red and green, and either red or green light are selectively lit to provide distinctive color display. Specifically, the LED L1 is lit green when the power switch 301 is ON and in a high-clock operation mode, and is lit red in a low-clock operation mode. The LED L2 is lit red at a low-battery state, is lit orange (red + green) in a fast charging mode, and is lit green when charging is completed. The LED L3 is lit red when the AC adapter 29 is effectively connected, and blinks red when the power source circuit 30 is in an abnormal status while the AC adapter 29 is effectively connected.

A D/A converter 310 converts digital charge control data from the power control CPU 306 into an analog signal and sends it to a charge unit 311 for the main battery 31A. The charge unit 311 charges the main battery 31A in accordance with a charge control signal from the D/A converter 310 under the control of the power control CPU 306.

An ammeter 312 detects the total amount of a current in the computer apparatus which includes a charge current of the main battery 31A.

An ammeter 314 detects a current flowing through the circuits in the computer apparatus, excluding a backup current.

A DC-DC converter 315 provides operating power (voltage) for each component of the computer apparatus from power supplied via the ammeter 314 from the AC adapter 29 or power supplied via the ammeter 314 from the main battery 31A.

An A/D converter 316 receives the detected values of the ammeters 312 and 314, the output voltage of the main battery 31A, and the output voltage of the DC-DC converter 315 and converts them into digital data, which is in turn supplied to the power control CPU 306.

A serial I/O 317 permits data exchange between the power control CPU 306 and the main CPU 11.

A charge unit 318 charges the sub-battery 31B. A DC-DC converter 319 receives power from the main battery 31A and power from the sub-battery 31B and provides a backup voltage (VBK).

Figure 4:
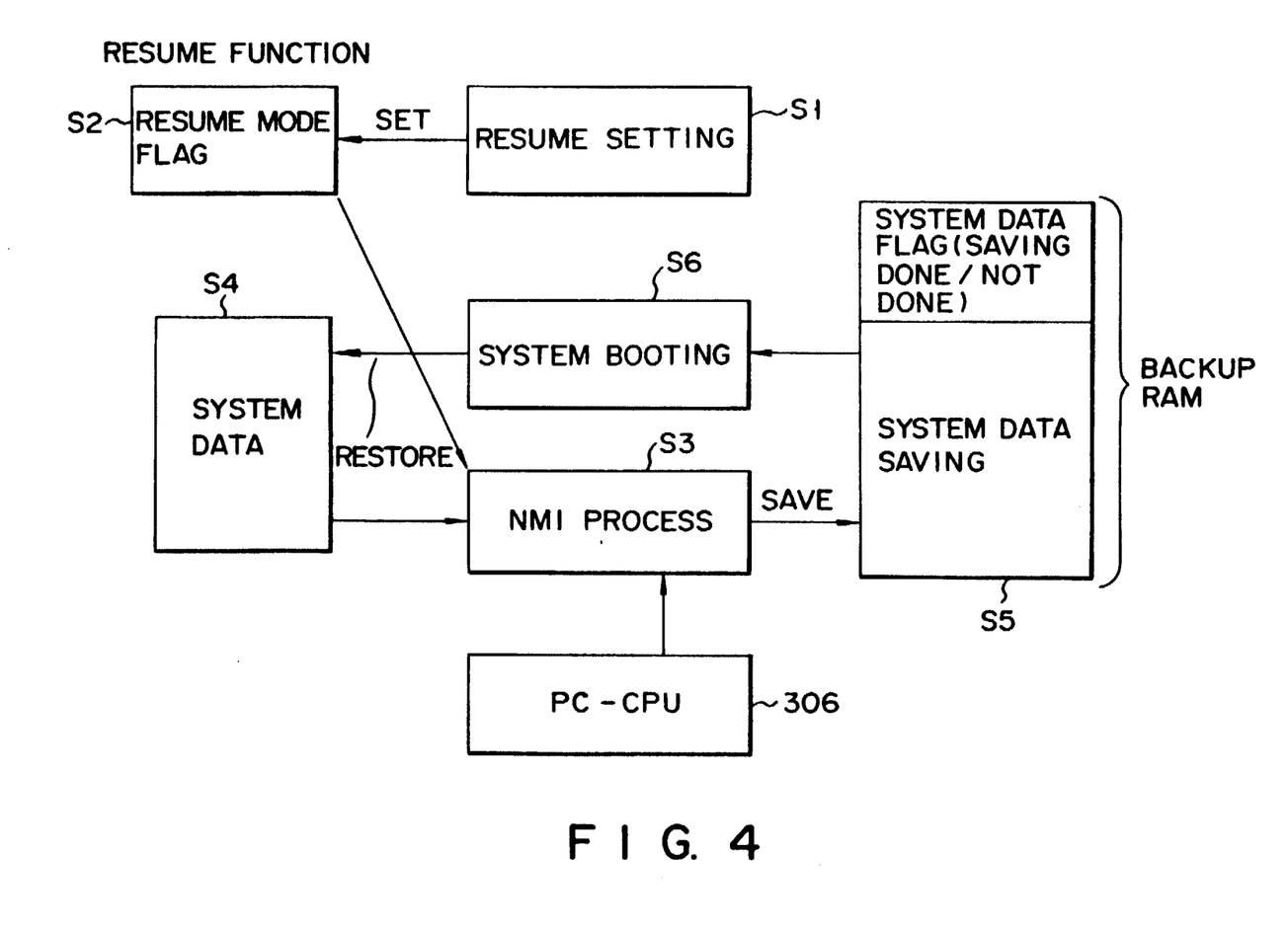
FIG. 4 is a diagram schematically illustrating the operation of the computer.

The operation of the structure as shown in FIGS. 1 through 3 will be briefly described referring to FIG. 4.

In a setup mode S1, ON/OFF of a resume function is set by a predetermined key operation, inputting a command, etc. Then, a resume mode flag S2 representing what is set is held in the RAM 13.

The power control CPU 306 always monitors the status of the power source circuit 30, irrespective of the ON/OFF of the power switch 301 of this computer. When detecting an abnormality of the power source circuit 30 including an abnormality of an output voltage, the PC-CPU 306 outputs a signal representing the occurrence of the abnormality and its content to the power-source control interface 28.

When the power switch 301 is turned off, the PC-CPU 306 informs the power-source control interface 28 of the event.

Upon reception of the information from the PC-CPU 306, the power-source control interface 28 outputs an NMI signal to the host CPU 11 according to the content of the information.

Upon reception of the NMI signal, the host CPU 11 executes an NMI process S3. More specifically, upon reception of the NMI signal indicating an abnormality of the power source circuit 30, the host CPU 11 invokes the resume function irrespective of the content of the resume mode flag S2 and saves into the backup RAM 19 system data (necessary for data processing in progress) including information, such as the contents of CPU registers, information of various LSIs and the value of a program pointer as shown by references S3, S4 and S5. The host CPU 11 also sets a flag (data) representing the event of the system data being saved, into the backup RAM 19.

Upon reception of an NMI signal indicating the normal termination of an operation (OFF of the power switch 301), the host CPU 11 refers to the resume mode flag S2. If the resume mode flag S2 is ON (valid), the CPU 11 saves the system data S4 into the backup RAM 19 and sets a system data flag indicating data having been saved. Then, the CPU 11 sends a signal to the PC-CPU 306 to execute a power OFF process (see FIG. 8).

If the resume mode flag S2 is OFF, on the other hand, the CPU 11 performs the power OFF process without performing the resume process.

When the power switch 301 is turned ON or the output voltage of the power source circuit 30 is restored, the CPU 11 refers to the system data flag S7 in the backup RAM 19.

If the system data flag S7 is ON (indicating occurrence of data saving), the CPU 11 stores the contents S5 of the backup RAM 19 back to the original locations, such as in the CPU registers, LSIs and pointers (S4, S5 and S6). The CPU 11 then continues the operation in accordance with the program and the content of data, which are stored in the RAM 13 (main memory).

If the system data flag S7 is OFF, the CPU 11 starts a control with the ordinary initial setting.

Referring to FIGS. 5 through 9, a detailed description will be given of the operation of the computer according to this embodiment.

Figure 5:
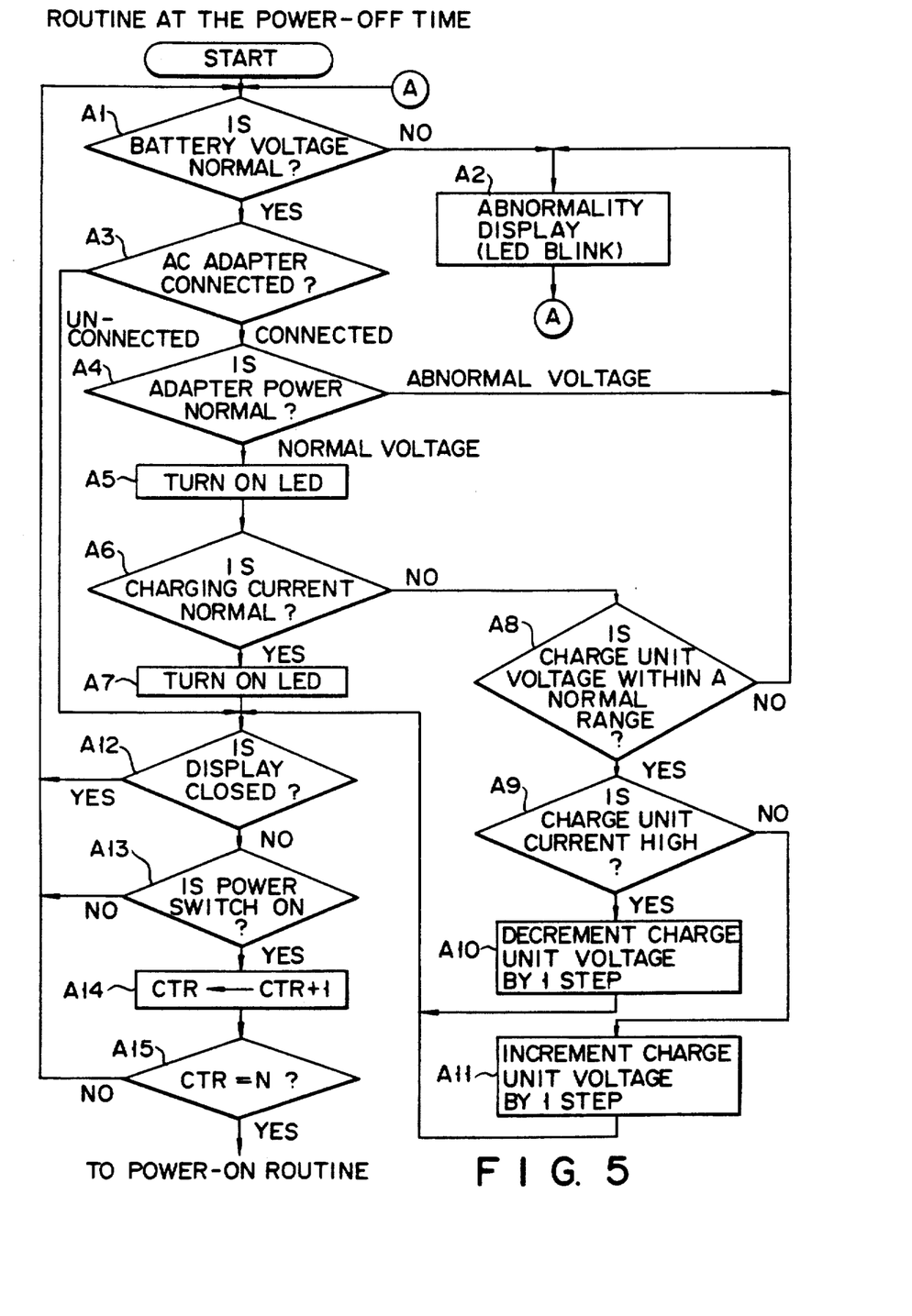
FIG. 5 is a flowchart illustrating the operation of a power control CPU at a power-OFF time.
Figure 6A:
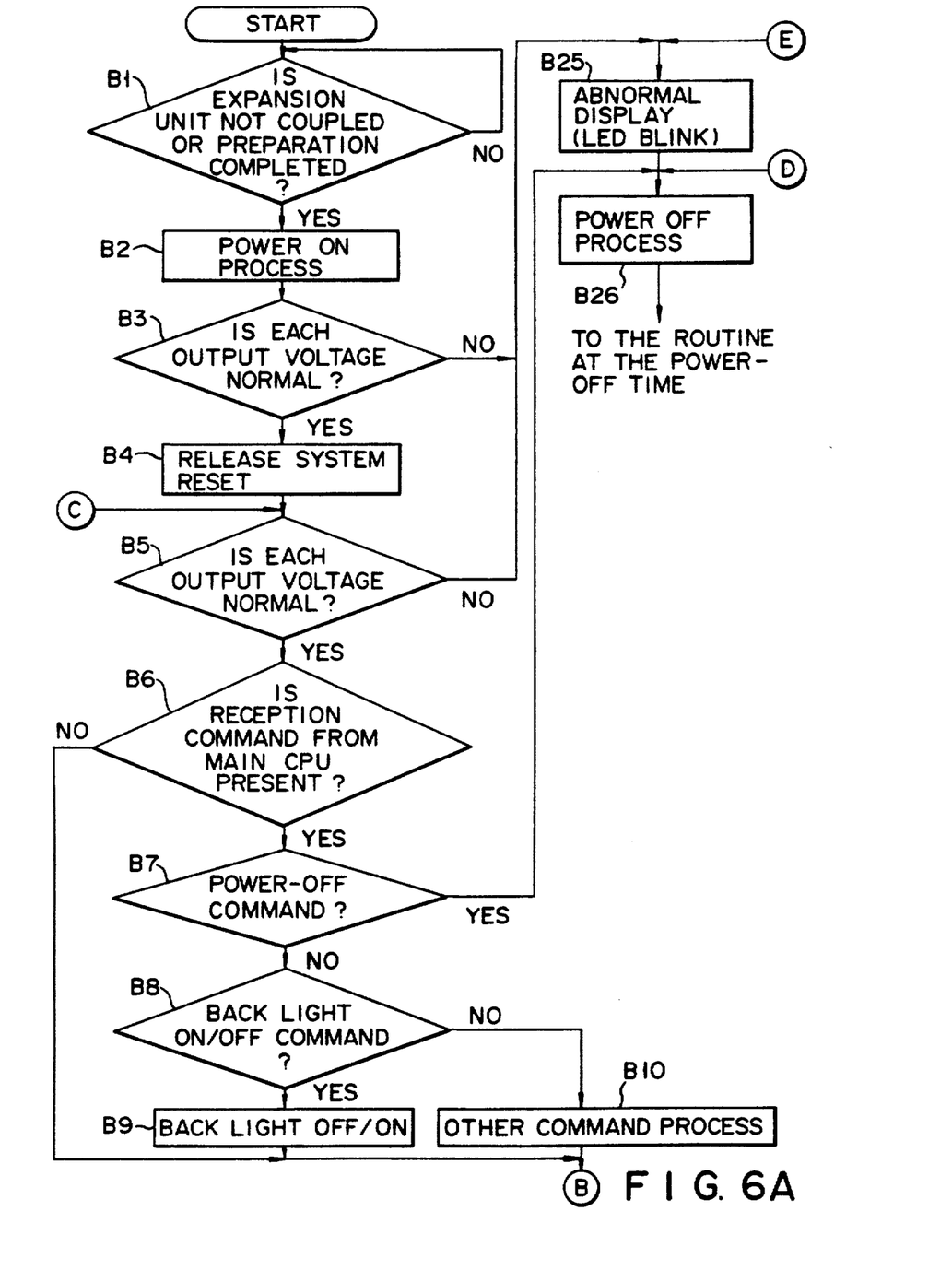
FIGS. 6A and 6B are flowcharts illustrating the operation of a power control CPU at a power-ON time.
Figure 6B:
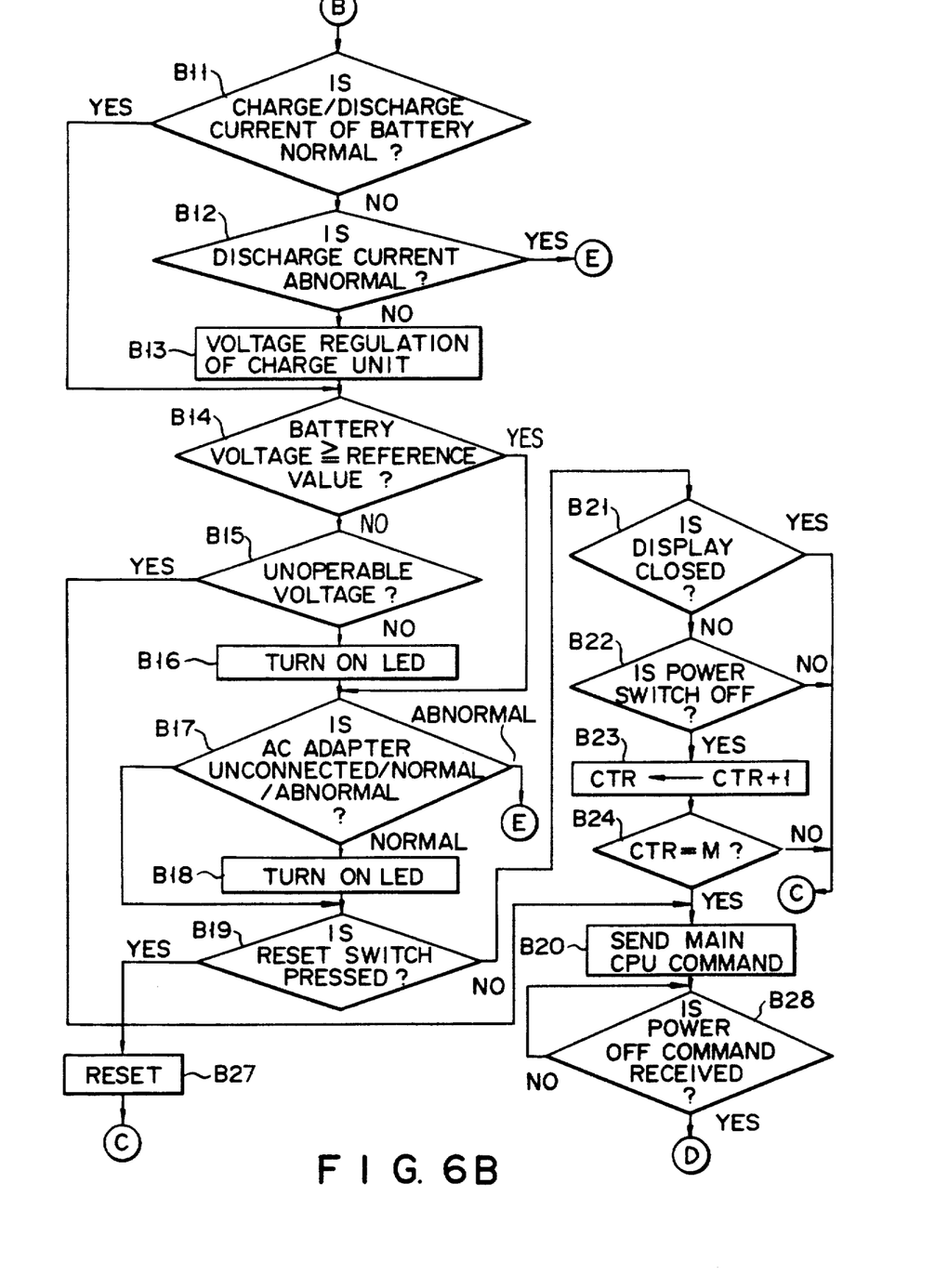
Figure 7:
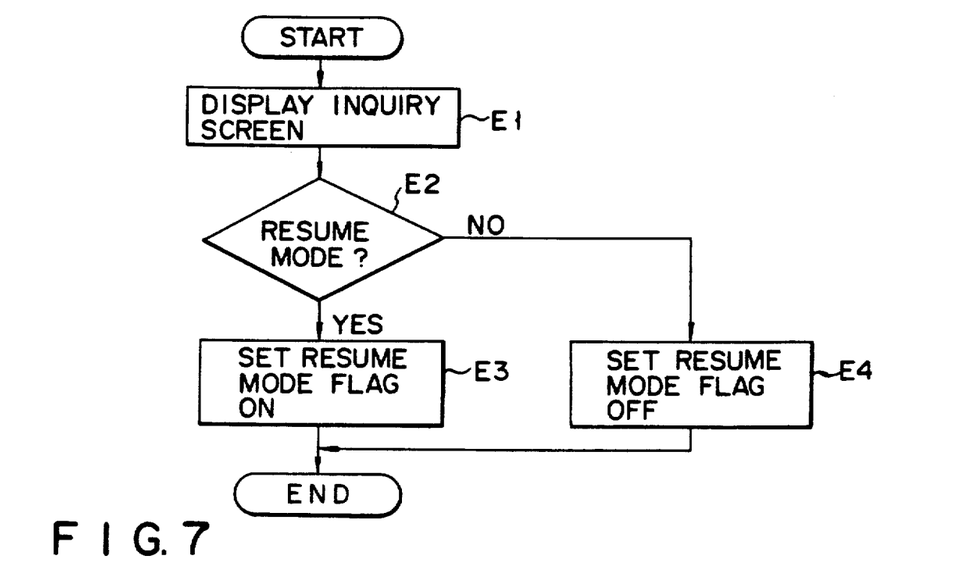
FIG. 7 is a flowchart illustrating the operation of a main CPU for setting ON/OFF of a resume function.
Figure 8:
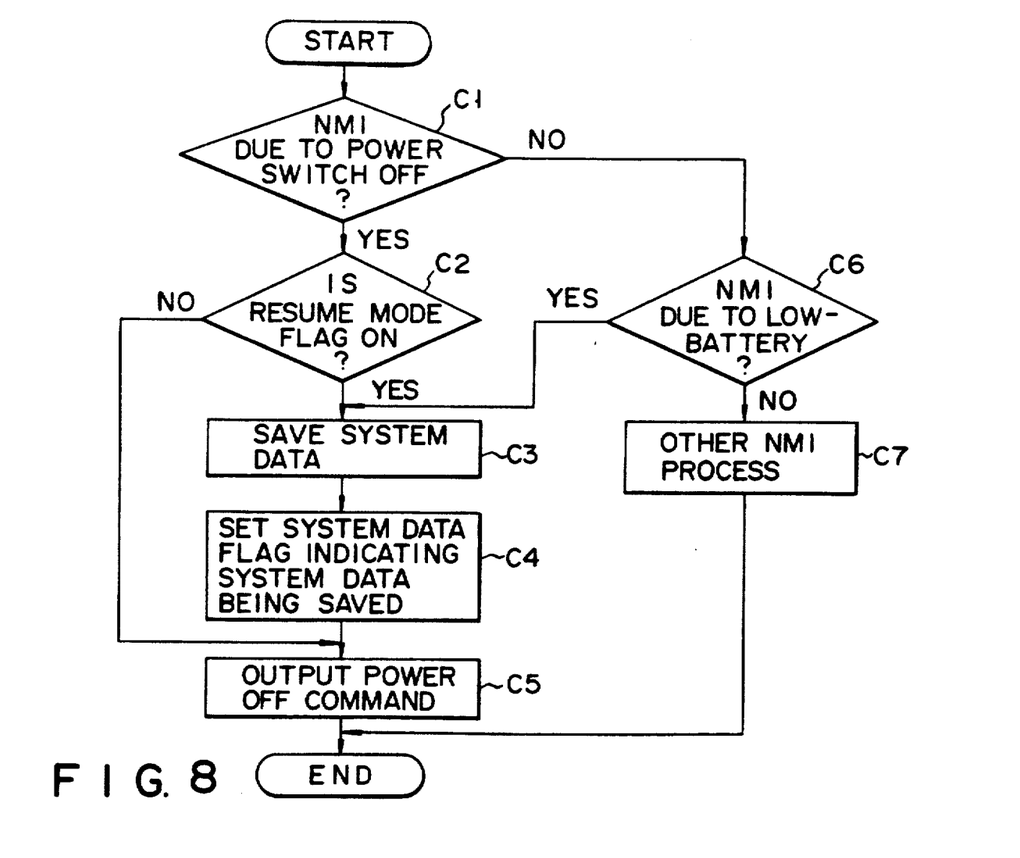
FIG. 8 is a flowchart illustrating the operation of the main CPU upon reception of an NMI signal.
Figure 9:
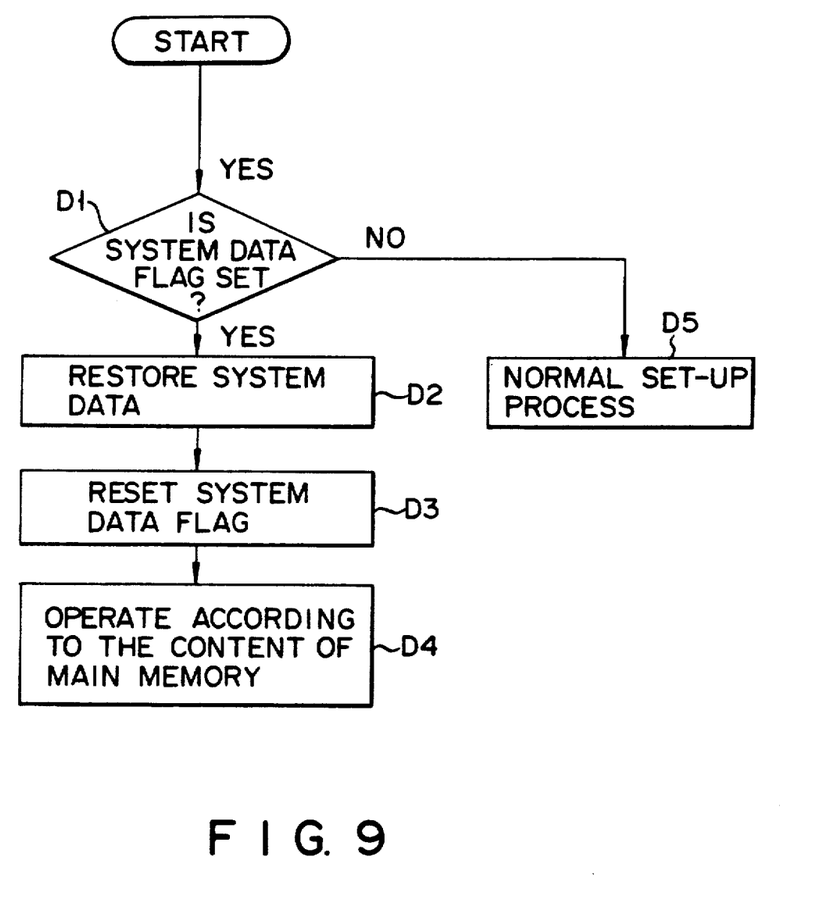
FIG. 9 is a flowchart illustrating a system boot process.

FIGS. 5, 6A and 6B presents flowcharts for the processes of the power control CPU 306; FIG. 5 illustrates a process routine at the power OFF time, and FIG. 6 a process routine at the power ON time. FIGS. 7 through 9 are flowcharts illustrating the processes executed by the main CPU 11; FIG. 7 illustrates a resume setting process routine, FIG. 8 an NMI process routine, and FIG. 9 a system boot process routine.

To begin with, the operation of the PC-CPU 306 will be described referring to FIGS. 5 and 6.

When the main power of the computer is set in OFF state, the PC-CPU 306 checks if the battery voltage is normal in step A1 as shown in FIG. 5. If the battery voltage is abnormal, the PC-CPU 306 controls the LED driver 309 via the internal bus 307 and parallel I/O 305 to blink the LED L1 (step A2).

When the battery voltage is normal, it is determined whether or not the AC adapter 29 is connected to the charge unit 311. If the AC adapter is not coupled to the charge unit 311, the flow jumps to step A12 (which will be described later). If the AC adapter 29 is coupled to the charge unit 311, it is determined whether o not the output voltage of the AC adapter 29 is normal (step A4). If the output voltage of the AC adapter 29 is abnormal, the flow jumps to step A2 to blink the LED L1.

If the output voltage of the AC adapter 29 is normal, the DC-IN-LED L2 is lit (step A5).

It is then determined whether or not the charging current is normal (step A6). The charging current can be determined from the difference between the reading of the ammeter 312 and that of the ammeter 314.

If the charging current is not normal, it is determined whether or not the output voltage of the charge unit 311 falls within the normal range (step A8). If the output voltage of the charge unit 311 is outside this range, the charge unit is considered damaged or improperly functioning and the flow jumps to the aforementioned step A2.

If the output voltage of the charge unit 311 falls within the normal range, it is determined whether the charging current is too high or too low (step A9). If the charging current is too large, the output voltage of the charge unit 311 is reduced by a given level (step A10). If this charging current is too small, the output voltage is increased by a given level, then the flow advances to step A12.

If it is determined in step A6 that the charging current is normal, the LED L3 is lit (step A7).

Then, it is determined whether or not the display unit 2 is closed (step A12). With the display unit 2 being closed, this computer is automatically set to a power OFF state, and the flow returns to step A1 and the above-described operation is repeated.

With the display unit 2 being open as shown in FIG. 1, however, it is determined whether or not the power switch 301 is ON (step A13). If the power switch 301 is ON, the content of the counter CTR is incremented by 1 (step A14).

Then, it is determined whether or not the value of the CTR counter has reached a predetermined value N (step A15). If this counter value has not reached N, the flow returns to step A1 and the above-described operation is repeated. The value of the CTR counter having reached N means that the power switch 301 is kept ON for a given period of time. In this case, therefore, the flow goes to the process for the power-ON time as shown in FIGS. 6A and 6B.

A description will now be given of the process at the power-ON time.

First, it is determined whether the expansion unit is not connected to the expansion connector 40 or the connection is completed (step B1). If the connection of the expansion unit is in progress, step B1 is repeated until the connection is completed.

Then, the PC-CPU 306 causes the parallel I/O 305 to output a signal Sa and causes the DC-DC converter 315 to output an operation voltage (e.g., 5 V, 12 V, $-9$ V or $-22$ V (step B2). The PC-CPU 306 further turns on the LED L1 and executes a process such as clearing the value of the CTR counter (step B2).

Next, it is determined whether or not the output voltages of the DC-DC converter 315 are normal (step B3). If each output voltage is abnormal, the flow advances to step B25 where the LED L3 blinks to indicate the source voltage is not normal. Then, the DC-DC converter 315 is deactivated and the main power source of the system is set OFF (step B26).

If it is determined in step B3 that each output voltage is normal, the system reset is released in step B4. This causes the main CPU 11 to substantially start the operation. As the releasing the system reset changes a load, the output voltages of the DC-DC converter 315 are again checked (step B5). If the output voltages are determined to be abnormal in step B5, the flow advances to the aforementioned step B25, then to step B26.

If the output voltages are determined to be normal in step B5, the PC-CPU 306 checks the presence or absence of a reception signal from the main CPU 11 through the serial I/O 317 (step B7). If no reception command is present, the flow advances to step B11.

If the reception command exists in step B7, its content is checked. If the reception command is a command to turn off the main power source, it is detected in step B7 and the PC-CPU 306 turns off the DC-DC converter 315 (step B26).

If the reception command is for turning the back light ON or OFF, the content of the reception command is detected in step B8. In accordance with the content of the reception command, the PC-CPU 306 controls the back light controller 308 to start or stop the power supply to the back light (step B9).

If the reception command is a command to execute other processing, the associated processing is carried out in step B10.

Next, it is determined whether or not the discharge current and charge current of the main battery 31A hold normal values (step B11). If the discharge and charge currents have normal values, the flow jumps to step B14. If the discharge current is abnormal, it is detected in step B12. In this case, the flow advances to the aforementioned step B25, then to step B26, and the main power source of this computer is turned off. If the discharge current is abnormal, on the other hand, the PC-CPU 306 controls the D/A converter 310 to adjust the voltage of the charge unit 311.

Then, the PC-CPU 306 determines whether or not the output voltage of the main battery 31A falls below a predetermined reference value (step B14). If the output voltage of this main battery 31A is greater than the reference value, the flow advances to step B17.

If the output voltage of the battery 31A is determined to be equal to or less than the reference value (low-battery status) in step B14, it is determined whether or not this output voltage is an unoperatable voltage (which is slightly higher than a voltage that may not be able to properly keep the system operation, for example). If the output voltage of the battery 31A is such an unoperatable voltage, the flow advances to step B20 where the PC-CPU 306 sends a signal indicating the low-battery state to the PS-IF 28 via the serial I/O 317. In response to this signal, the PS-IF 28 outputs an NMI signal indicating that the main battery 31A is in a low-battery state, i.e., a low-battery NMI signal, to the CPU 11. In response to this low-battery NMI signal, the main CPU 11 performs a resume process, which will be described later referring to FIG. 7.

If the output voltage of the main battery 31A is lower than the reference value but has not reached the unoperatable level, the flow advances to step B16. In step B16, the PC-CPU 306 controls the parallel I/O 305 and LED driver 309 to blink the LED L2 in red.

Then, the PC-CPU 306 checks the status of the AC adapter 29. If the AC adapter 29 is unconnected to the power source circuit 30, the flow jumps to step B19. If the AC adapter 29 is connected to the power source circuit 30 and its output voltage is abnormal, the flow jumps to the aforementioned step B25, then advances to step B26. If the AC adapter 29 is coupled to the power source circuit 30 and its output voltage is normal, the LED L3 is lit red (step B18).

Then, it is determined whether or not the reset switch 302 is ON (step B19). If the resent switch 302 is ON, the PC-CPU 306 resets the main CPU 11 via the serial I/O 307 and PS-IF 28 by, for example, setting the clear terminal of the main CPU 11 at a low level (step B27). The flow then advances to step B5.

If the resent switch 302 is not set ON, the flow advances to step B21. In this step B21, the PC-CPU 306 determines whether or not the display unit 2 shown in FIG. 1 is closed. If it is closed, the flow advances to the aforementioned step B5. If the display unit 2 is open, the flow advances to step B22 where it is determined whether or not the power switch 301 is set OFF. If the power switch 301 is ON, the flow returns to the step B5.

If the power switch 301 is OFF, the PC-CPU 306 increments the value of the CTR counter by 1 (step B23). It is then determined whether or not the this counter value has reached a given value M (step B24). If the counter value has not reached M, the flow returns to step B5.

If the value of the CTR counter coincides with the given value M (i.e., if the OFF state continues for more than a given period of time), the PC-CPU 306 issues a command to turn off the main power source via the serial I/O 317 to the PS-IF 28 in step B20. The command is set in a register in the PS-IF 28. In response to this command set in the register, the PS-IF 28 issues an NMI signal instructing turning off of the main power source (power-off NMI signal) to the main CPU 11. In response to the received signal, the CPU 11 executes the process shown in FIG. 8.

When a power-off command is issued from the main CPU 11 (step C5), the flow advances to step B26, and the PC-CPU 306 clears the content of the CTR counter and drives the parallel I/O 305 to output the signal Sa so as to deactivate the DC-DC converter 315, thereby stopping the supply of operating power to the individual components in the system. It should be noted, however, that the supply of the backup voltage VBK continues.

Leaving the operational description of the PC-CPU 306, the operation of the main CPU 11 will now be described.

To begin with, a description will be given of the operation of setting the resume function of this computer apparatus ON and OFF (setting/releasing of the resume mode).

When an operator performs a predetermined key operation or enters a predetermined command, the computer apparatus enters a setup mode and a setup program is invoked.

The setup program includes a routine shown in FIG. 7, which is for setting the resume function ON and OFF.

When the routine shown in FIG. 7 is invoked, the LCD 37 displays whether or the resume mode should be set (E1). When the operator enters data through, for example, the keyboard 36 in response to this display, the content of the data is checked in step E2. If the command is for setting the resume function ON, the resume mode flag is set in, for example, a backed-up memory included in the RTC 17 in step E3. If the command is for setting the resume function OFF, the resume mode flag is set off (step E4).

A description will now be given of the operation when the main CPU 11 has received the NMI signal from the PS-IF 28 (step B20 in FIG. 6B).

First, the main CPU 11 determines the type of the received NMI signal (step C1, C6). That is, the main CPU 11 determines whether the received NMI sig-nal has been issued due to the power switch 301 set OFF or due to a low-battery state (step C1, C6).

When the received NMI signal has been originated from the setting off of the power switch 301, it is determined whether or not the resume mode flag is set ON (step C2).

If the resume mode flag is OFF, it is unnecessary to save the system data, so that the flow jumps to step C5 to be described later.

If the resume mode flag is ON, the main CPU 11 stores the contents of the individual built-in registers, the contents of the instruction point indicating the location of the executed instruction in the program, the content of the hardware register, etc. into the backup RAM 19 (step C3). The main CPU 11 further sets a flag indicating that the system data has been saved into the backup RAM 19 (step C4).

Thereafter, the CPU 11 outputs the power-OFF command to the PC-CPU 306 via the PS-IF 28 and serial I/O 317. This command is detected in step B25.

If the NMI signal that the CPU has received is a low-battery NMI signal, the flow sequentially advances to the aforementioned steps C3, C4 and C5, passing steps C1 and C6. That is, the resume function is executed irrespective of whether the resume mode flag is set ON or OFF (setting the resume function ON or OFF).

If the received NMI signal is other than those described above, the associated NMI process is executed.

The system boot process will now be described referring to FIG. 9.

When the power switch 301 is set ON or the output voltage of the battery 31A is restored to the normal level, the event is detected by the PC-CPU 306 and the system reset is released in step B4 through a sequence of processes.

When the system reset is released, the main CPU 11 determines whether or not the system data is saved in the backup RAM 19, for example, checking the system data flag, as shown in FIG. 9 (step D1).

If no system data has been saved, the flow advances to step D5 and a process that should be executed upon normal power on will be performed (step D5).

If it is determined in step D1 that the system data has been saved, the CPU 11 stores the system data saved in the backup RAM 19 back to the original location (step D2). For instance, the CPU 11 moves the saved value of the instruction pointer into the instruction pointer, and sets the saved register value back to the original register.

The CPU 11 then resets the system data flag (step D3).

Thereafter, the CPU 11 functions in accordance with the content of the program stored in the RAM 13.

In brief, according to this embodiment, the PC-CPU 306 always functions irrespective of whether or not the power switch 301 is set ON or OFF, and monitors the status of the power source circuit 30 and displays the monitored status.

Further, upon detection of an abnormal source voltage (reduction in the output voltage) or actual switching off of the power switch 306, the PC-CPU 306 sends the NMI signal (e.g., low-battery NMI or power-switch-OFF NMI) to the main CPU 11 via the PS-IF 28.

Upon reception of the power-switch-OFF NMI signal, the host CPU 11 recognizes the set status of the resume function and performs a process according to the set status.

Upon reception of the low-battery NMI signal, the CPU 11 executes the resume function irrespective of the set status of the resume mode, and saves the system data into the backup RAM 19.

If the power switch is set ON or the voltage of the battery 31A is restored to the normal level, the main CPU 11 executes the system boot process. In the case of "the system data has been saved," the CPU 11 sets the data saved in the backup RAM 19 back to the original location, and gives the control to the program stored in the RAM (main memory) 13.

As described above, according to this embodiment, when the low-battery status is detected, the resume process is executed irrespective of ON/OFF of the resume function. When a power abnormality, such as a low-battery state, occurs, therefore, the data processing at that time can surely be executed. Further, the use of the resume function requires fewer additional hardware. If the power source is restored to the normal state, the data processing can be resumed from the interrupted point, not from the beginning, thus ensuring efficient processing.

The present invention is not restricted to the above particular embodiment, but can be modified in various manners or can apply to other devices than computers.

For instance, although the resume process is executed only when the battery voltage becomes low in the above-described embodiment, it is possible to execute the resume process when other power abnormality is detected, i.e., when an abnormality is detected in, for example, step B5, B12 or B17, before the power source is turned OFF.

In view of the above, the present invention is very effective and useful in improving the reliability of a portable computer which is operable on a battery to make the good use of its portability.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing system comprising:
   data processing means for processing data;
   power switch means for instructing ON and OFF of a main power supply of said system;
   a battery;
   power supply control means connected to said data processing means, said battery, and said power switch means;
   instruction means for setting a resume flag which instructs ON/OFF of a resume function; and
   a nonvolatile memory;
   said power supply control means performing functions of:
   (1) checking an output voltage of said battery and sending a predetermined detection signal to said data processing means when said output voltage is lower than a predetermined voltage,
   (2) sending a signal for turning off the main power supply to said data processing means in response to the instructions to turn off the main power supply by said power switch means,
   (3) stopping the supply of the operating power to said data processing means in response to instructions from said data processing means, and
   (4) supplying the operating power to said data processing means on the basis of the output power of said battery, in response to instructions to turn on the main power supply by said power switch means; and
   said data processing means performing functions of:
   (1) checking said resume flag, in response to instructions of signals to turn off the main power supply from said power supply control means,
   (1)-(i) saving system data which shows a data processing state by data processing means to said memory, thereafter controlling said power supply control means to stop the supply of the operating power to said data processing means, when said resume flag is set,
   (1)-(ii) controlling said power supply control means without saving said system data to stop the supply of the operating power to said data processing means, when said resume flag is not set,
   (2) saving said system data to said memory in response to said detection signal, irrespective of the ON/OF state of said resume flag, thereafter controlling said power supply control means to stop the supply of the operating power to said data processing means,
   (3) checking whether said system data is saved to said memory or not after the power supply from said power supply control means is resumed,
   (3)-(i) resuming the data processing from a state when the system data is saved, on the basis of the system data saved in said memory, and
   (3)-(ii) starting newly the data processing, when said system data is not saved.

2. A data processing system according to claim 1, wherein said power supply control comprises:
   means for displaying a reduction in the output voltage of said battery, when the output voltage of said battery is equal to or lower than a first voltage which is higher than said predetermined voltage, said power supply control means not supplying said detection signal to said data processing means when the output voltage of said battery is higher than said predetermined voltage and lower than the first voltage.

3. A data processing system according to claim 1, wherein said power supply control means checks the output voltage of said battery in response to instructions to turn on the main power supply by said power switch means, and said power supply control means supplies the operating power to said data processing means on the basis of the output power of said battery, when said output power is equal to or higher than said predetermined voltage.

4. A data processing system according to claim 1, wherein said power supply control means comprises:
   means connected to said battery for rectifying supplied AC current to DC current and charging said battery,
   first check means connected to said battery for checking discharging current of said battery,
   DC/DC conversion means connected to said battery for performing DC/DC conversion of the output voltage of said battery and supplying said converted voltage to circuits which include said data processing means,
   second check means connected so said DC/DC conversion means for checking the output voltage of said DC/DC conversion means, and
   means connected to said first and second check means for displaying abnormal states of at least one of said discharging current of said battery, and the voltage after DC/DC conversion by said DC/DC conversion means when the abnormal states occur, and for stopping the power supply to said data processing means.

5. A data processing system according to claim 1, wherein said power supply control means comprises:
   charging means connected to said battery for rectifying supplied AC current to DC current and charging said battery, and
   means connected to said battery and charging means for checking charging current of said battery and controlling said charging means to obtain the appropriate charging current.

6. A data processing system according to claim 1, wherein:
said data processing means and power supply control means each have a respective CPU, and
said power supply control means informs said data processing means by an NMI signal that said power switch has been instructed to turn off the main power supply and that the output voltage of said battery is equal to or less than said predetermined value.

7. A data processing system according to claim 1, wherein said memory comprises a volatile memory being the backup operation performed by a battery thereto.

8. A data processing system according to claim 1, wherein said data processing means includes means for restoring the system data saved in said memory, after the power supply from said power supply control means is resumed.

9. In a data processing system including storage means, and a power supply control means for controlling supply of driving power from a battery to each of components of the data processing system, a method of controlling operation of the data processing system and comprising the steps of:
setting initiation of a resume function;
determining whether the battery is in a low battery state in which an output voltage of the battery is lower than a predetermined voltage;
saving system data, which shows a state of data processing in the data processing system, in the storage means, when the low battery state is determined, irrespective of whether or not the initiation of the resume function is set; and
controlling the power supply control means to stop supply of the driving power to each of the components of the data processing system.

10. The method according to claim 9, wherein the determining step comprises the steps of:
detecting an interrupt signal indicating the low battery state; and
determining that the battery is in the low battery state, in response to the detected interrupt signal.

11. The method according to claim 9, further comprising the step of:
setting in the storage means a system data flag indicating that the system data has been saved in the storage means.

12. The method according to claim 11, further comprising the step of:
outputting a power-off signal to the power supply control means, to stop supply of the driving power to each of the components of the data processing system.

13. The method according to claim 11, further comprising the steps of:
determining whether the battery is in a normal battery state in which the output voltage of the battery is higher than a predetermined level; and
supplying the driving power from the battery to the data processing system when the normal battery state is determined.

14. The method according to claim 13, further comprising the steps of:
determining whether the system data flag is set;
restoring the system data saved in the storage means to the data processing system when the system data flag is determined as being set; and
resuming operation of the data processing system from a time at which supply of the driving power was stopped.

15. The method according to claim 9, further comprising the step of:
alerting an operator when the battery is in the low battery state.

16. Apparatus for controlling operation of a data processing system comprising:
storage means for storing data used by the data processing system;
a rechargeable battery pack for supplying power to the data processing system;
setting means for setting initiation of a resume function, the resume function protecting system data from loss, the system data showing contents of data processing;
determining means for determining whether the battery pack is in a low battery state, the low battery state being a state in which an output voltage of the battery pack is lower than a predetermined level;
saving means for saving the system data in the storage means when a low battery state is determined irrespective of whether initiation of the resume function is set; and
means, coupled to said battery pack, for stopping supply of the driving power to each of the components of the data processing system.

17. The apparatus according to claim 16, wherein the determining means comprises:
detection means for detecting an interrupt signal indicating a low battery state, and determining, in response to the detected interrupt signal, whether an output voltage of the battery pack is lower than a predetermined level.

18. The apparatus according to claim 16, further comprising:
setting means for setting in the storage means a system data flag indicating that the system data has been saved in the storage means; and
outputting means for outputting a power-off signal to the power supply control means, to stop supply of the driving power.

19. The apparatus according to claim 18, further comprising:
means for determining whether the battery pack is in a normal battery state in which an output voltage of the battery pack is higher than a predetermined level; and
means for supplying the driving power to the data processing system when a normal battery state is determined.

20. The apparatus according to claim 19, further comprising:
means for determining whether the system data flag is set or not;
means for restoring the system data saved in the storage means to the data processing system when the system data flag is determined as being set; and
resuming operating of the data processing system from a time at which supply of the driving power was stopped.

21. The apparatus according to claim 19, further comprising:
means for turning on a power switch to supply the driving power to the data processing system; and
means for checking the state of the battery pack, in response to the power switch being turned on.

22. The apparatus according to claim 16, further comprising:
means for alerting an operator when the battery pack is in the lower battery state.

* * * * *